United States Patent Office 3,824,314
Patented July 16, 1974

3,824,314
ANTI-INFLAMMATORY PREPARATIONS
Bernard Lacoume, Eragny-sur-Epte, France, assignor to Akzona Inc., Asheville, N.C.
No Drawing. Continuation-in-part of abandoned application Ser. No. 169,803, Aug. 6, 1971. This application May 30, 1972, Ser. No. 257,542
Claims priority, application Netherlands, Aug. 20, 1970, 7012303
Int. Cl. A61k 27/00
U.S. Cl. 424—274                4 Claims

ABSTRACT OF THE DISCLOSURE

It was found that 1,2,3,4-tetrahydro-6-methoxy-carbazole-2-carboxylic acid and salts, esters and amides thereof have a very good anti-inflammatory activity, comparable with the known highly active anti-inflammatory substances. Surprisingly, however, these compounds do not induce any ulcerogenic activity, so that they can be administered in much higher dosages. It was further found that the said compounds have a more prolonged activity in comparison with phenylbutazone, especially on parenteral administration.

REFERENCE TO RELATED APPLICATIONS

This application is a continuation-in-part and division of copending application, Ser. No. 169,803, filed Aug. 6, 1971, now abandoned.

The invention relates to a pharmaceutical preparation with anti-inflammatory activity.

BACKGROUND OF THE INVENTION

In J. Het. Chem., 7, 239 (1970), G. R. Allen describes the preparation of 1,2,3,4-tetrahydro - 6 - methoxy-carbazole-2-carboxylic acid and its methyl ester. The said article does not indicate any biological activity for these compounds, nor has such activity been described elsewhere in the literature, as far as is known. The preparation of the acid and its methyl ester is set forth in Example I below.

It is further known from British Pat. No. 1,183,093 that certain derivatives of 1,2,3,4-tetrahydro-carbazole, which are substituted at the nitrogen atom with an acyl group, more particularly with the p-chloro-benzoyl group, exert an anti-inflammatory activity. However, those derivatives having a carboxy-moiety in position 2 appear to have a rather poor anti-inflammatory activity.

SUMMARY OF THE INVENTION

Surprisingly it has now been found that the substance 1,2,3,4-tetrahydro - 6 - methoxy-carbazole-2-carboxylic acid with the formula:

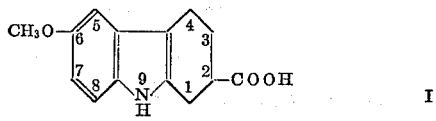

as well as the salts, lower aliphatic, aromatic or araliphatic esters and amides thereof, have a very good anti-inflammatory activity, comparable with that of the known highly active anti-inflammatory substances, such as phenylbutazone, but do not induce any ulcerogenic activity.

This combination of properties has the great advantage that the compound I as well as the salts, esters or amides thereof can be administered in much higher dosages and they can have a stronger anti-inflammatory effect. Moreover it has been found that the present compounds have a more prolonged activity in comparison with phenylbutazone, especially on parenteral administration.

The present compounds, having an anti-inflammatory activity, can be applied either orally, parenterally or locally. For this purpose they have to be administered, incorporated in a suitable pharmaceutical composition, for example, in the form of a tablet, pill, suppository, coated tablet, grain, powder and capsule, or in the form of a liquid such as a solution, suspension or emulsion, or the form of an ointment or spray.

These pharmaceutical compositions can be sterilised, if desired, and they may contain besides the usual auxiliaries also flavourings, colouring matter, preservatives, stabilizers, wetting agents or solvents, as well as buffers or agents for adjusting the osmotic pressure.

Auxiliaries which can be employed usefully in the composition according to the invention are pharmaceutically acceptable substances which do not react with the active substances, such as gelatin, lactose, starch, talc, magnesium stearate, gums, vegetable oils and polyalkylene glycols. Injectable preparations should preferably contain sterile, pyrogen-free water or oil as carrier.

The composition according to the invention intended for oral administration should preferably contain 5–500 mg. of active substance per dosage unit. Injectable preparations should preferably contain 10–500 mg. of active substance per ml., and the preparations suitable for local administration preferably 0.1–50 mg. of the active substance per 100 mg. of the preparation. The above dosage ranges are based upon the use of 1,2,3,4-tetrahydro-6-methoxy-carbazole - 2 - carboxylic acid. The salts, esters and amides can be administered preferably within the same dosage ranges. Dependent on their molecular weights these derivatives are administered, in general, in a dose which is somewhat higher than that of the free acid.

The composition according to the invention can also be mixed with other active components, for example antibiotics such as bacitracin, neomycin, tetracycline and oxytetracycline, or antiseptics such as chlorohexidine and hexachlorophene.

The esters of the compound according to formula I, which can be used in the present invention, are lower aliphatic esters such as the methyl, ethyl, propyl, butyl or isobutyl ester. Further aromatic esters such as phenyl, p-chlorophenyl or p-aminophenyl ester, and the lower araliphatic esters such as the benzyl, p-chlorobenzyl, phenylethyl and phenylpropyl ester.

The salts of the compound according to formula I, which can be used in the present invention, include the sodium, potassium, magnesium, calcium or zinc salt, or a salt obtained by reacting the acid with ammonia or a primary, secondary or tertiary amine such as aminoethanol and dimethylamino-ethanol.

With amides is meant the unsubstituted or substituted, preferably mono- or di-lower alkyl (1–6 C) substituted, amides of the acid according to the general formula I. They are prepared in the usual manner by aminolysis of the ester or by reaction of the acid chloride or mixed anhydride with the amine in question.

BIOLOGICAL ACTIVITIES

(A) Rat paw oedema test

The anti-inflammatory activity of various compounds was assayed in the rat paw caragenin test.

| Substance | Oral dose in mg./kg. | Percent inhibition of the oedema |
|---|---|---|
| (1) 1,2,3,4-tetrahydro-carbazole-2-carboxylic acid | 100 | 18 |
| (2) 1,2,3,4-tetrahydro-9-(N)-p-chlorobenzoyl-carbazole-2-carboxylic acid | 100 | 6 |
| (3) 1,2,3,4-tetrahydro-9-(N)-p-chlorobenzoyl-6-methoxy-carbazole-2-carboxylic acid | 120 / 100 | 16 / 8 |
| (4) 1,2,3,4-tetrahydro-6-methoxy-carbazole-2-carboxylic acid | 60 | 45 |

Compounds 2 and 3 are covered by the British patent mentioned before; whereas compound 4 is a substance according to the present invention.

The well-known anti-inflammatory substance phenylbutazone showed a mean inhibition of about 50% in the above test at a dose of 60 mg. per kg.

(B) U.V. erythema test

Exposure of depilated skin of guinea pigs to U.V. light results in the development of a red patch, a so-called erythema, which is maximal after about 2 hours and lasts for at least 24 hours. Anti-inflammatory substances taken or injected before the exposure delay the development of an erythema.

The pigs are divided arbitrarily into groups of five. Each group is treated with a certain dose of the substance to be tested. Each pig is exposed to U.V. light for 3 minutes in 3 places. These spots are tested for the development of an erythema after 2, 3, 4, 6, and 24 hours. A spot which develops a complete erythema scores 1, a spot with a partially developed erythema 0.5 and a spot without erythema 0. Consequently when a group of pigs treated with a certain dosage of the substance to be tested has reached a total score of 15 this means that the substance is completely inactive, or has lost its activity at the moment of the examination.

| Subcutaneous administration | | Erythema developed after— | | | | |
|---|---|---|---|---|---|---|
| Substance | Dosage, mg./kg. | 2 hrs. | 3 hrs. | 4 hrs. | 6 hrs. | 24 hrs. |
| Blanc | | 7.5 | 13.5 | 14.0 | 14.5 | 15.0 |
| Phenylbutazone | 12.5 | 0.5 | 1.0 | 2.5 | 6.5 | 13.5 |
| A* | 12.5 | 2.0 | 2.5 | 4.0 | 7.5 | 8.5 |
|  | 50.0 | 0 | 1.0 | 2.5 | 3.0 | 6.0 |

*Compound A is 1,2,3,4-tetrahydro-6-methoxy-carbazole-2-carboxylic acid.

The above table shows that the anti-inflammatory activity of the compound of formula I is practically equal to that of phenylbutazone, but the activity lasts much longer.

(C) Ulcerogenic activity

The substance to be tested is administered to rats by the oral route. Six hours after administration of the substance to be tested the stomach of the test animals is examined for ulcers. Per dosage unit 10 rats are used.

| Substance | Dosage, mg./kg. | Number of rats tested | Number of rats with ulcers |
|---|---|---|---|
| Blanc | | 10 | 3 |
| Phenylbutazone | 100 | 10 | 10 |
|  | 200 | 10 | 10 |
| A* | 200 | 10 | 1 |
|  | 400 | 10 | 3 |

*Compound A: 1,2,3,4-tetrahydro-6-methoxy-carbazole-2-carboxylic acid.

The following examples serve to illustrate the invention further.

DESCRIPTION OF THE PREFERRED EMBODIMENTS

Example I (A) 1,2,3,4-tetrahydro-6-methoxy-carbazole - 2 - carboxylic acid.—A mixture of 3 gm. of p-methoxyphenylhydrazine and 3 gm. of 3-keto-cyclohexane-carboxylic acid in 25 ml. of glacial acetic acid is left to stand overnight and stirred now and again during this period. The precipitate formed is filtered off and recrystallised from acetic acid. Melting point: 223–227° C.

Analysis.—Calculated (percent): C, 68.54; H, 6.16; N, 5.71; O, 19.56. Found (percent): C, 68.70; H, 6.07; N, 5.85; O, 19.51.

(B) Methyl - 1,2,3,4-tetrahydro-6-methoxy-carbazole-2-carboxylate.—A mixture of 3 gm. of p-methoxyphenyl-hydrazine and 3 gm. of 3-keto-cyclohexane-carboxylic acid in 250 ml. of methanol is refluxed for 6 hours. Then the methanol is distilled off, after which the residue is taken up in ether and washed with water. Drying over sodium sulphate and removal of ether provided a crude oil, which crystallized after some time. Melting point of the methylester: 120–125° C.

In the same manner the ethyl ester is prepared.

The above-mentioned methylester is refluxed in methanolic KOH and water. The resulting mixture is treated with dilute hydrochloric acid and extracted with ether to obtain the free acid. Melting point: 224–227° C. On mixing this acid with the acid obtained in Example I(A) the melting point does not fall.

Example II

Via the acid chloride of 1,2,3,4-tetrahydro-6-methoxy-carbazole-2-carboxylic acid are prepared the corresponding benzyl and phenylethyl ester.

Via the mixed anhydride of the said acid, obtained with the ethyl ester of chloroformic acid, are prepared the unsubstituted amide and the diethylamide.

Example III

Lactose (67.25 kg.) is mixed with 1.75 kg. of finely powdered amylopectin. The mixture is passed into a kneading machine, after which 4 kg. of water are added and the mixture is kneaded. Then the resulting mass is passed through a hammer mill. The ground mass is dried below 60° C. and sieved. The resulting mixture (69 kg.) is mixed in a mixing machine with 10 kg. of starch and 20 kg. of 1,2,3,4-tetrahydro - 6 - methoxy-carbazole-2-carboxylic acid, after which 1 kg. of magnesium stearate is added. Then the mass is tableted into 100 mg. tablets, containing 20 mg. of active substance each.

In the same manner 100 mg. tablets are prepared containing 20 mg. of the sodium salt of 1,2,3,4-tetrahydro-6-methoxy-carbazole-2-carboxylic acid (melting point of the said sodium salt: >310° C.).

Example IV.—Suspension in 1 ml. ampoules

Composition per ml:                                       Mg.
 1,2,3,4-tetrahydro-6-methoxy-carbazole-2-carboxylic acid _____ 15
 Polysorbate 80 (Tween 80) _____ 2
 Monosodiumphosphate O. aq. _____ 11.5
 Di-sodium phosphate O. aq. _____ 3
 Benzylalcohol _____ 10
 Water to 1 ml.

Example V.—W/o cream

Composition per gram:                                     Mg.
 1,2,3,4-tetrahydro-6-methoxy-carbazole-2-carboxylic acid _____ 10
 Cera alba (beeswax) _____ 195
 Perhydrosqualene _____ 500
 Tween 60 _____ 25
 Span 60 _____ 25
 Purified water to 100 mg.

Example VI.—Suppository

Composition per dose unit:
 1,2,3,4-tetrahydro-6-methoxy-carbazole-2-carboxylic acid _____ mg__ 10
 Witepsol E–85 _____ g__ 1.3
 Witepsol W–25 _____ g__ 0.7
 (The melting point is approximately 38° C.).

What is claimed is:

1. A pharmaceutical preparation in unit dosage form adapted for administration to obtain anti-inflammatory action, in the form of a tablet, containing as its active ingredient an effective amount within the range from about 5 to about 500 mg. per dosage unit of a compound selected from the group consisting of 1,2,3,4-tetrahydro- 6-methoxy-2-carboxylic acid and a pharmaceutically acceptable salt, lower aliphatic ester, phenolic ester, and phenyl lower alkyl ester thereof.

2. The preparation of claim 1 in which said active ingredient is 1,2,3,4-tetrahydro-6-methoxy-carbazole-2-carboxylic acid.

3. A pharmaceutical preparation in unit dosage form adapted for administration to obtain anti-inflammatory action, in the form of a suppository, containing as its active ingredient an effective amount within the range from about 5 to about 500 mg. per dosage unit of a compound selected from the group consisting of 1,2,3,4-tetrahydro-6-methoxy-2-carboxylic acid and a pharmaceutically acceptable salt, lower aliphatic ester, phenolic ester, and phenyl lower alkyl ester thereof.

4. The preparation of claim 3 in which said active ingredient is 1,2,3,4-tetrahydro-6-methoxy-2-carboxylic acid.

References Cited

UNITED STATES PATENTS 3,535,326   10/1970   Yamamoto et al. ____ 260—315

OTHER REFERENCES

J. Heterocyclic Chemistry, 7:239–241 (February 1970), Allen.

STANLEY J. FRIEDMAN, Primary Examiner

U.S. Cl. X.R.

260—315

UNITED STATES PATENT OFFICE
CERTIFICATE OF CORRECTION

Patent No. 3,824,314          Dated   July 16, 1974

Inventor(s)   Bernard Lacoume

It is certified that error appears in the above-identified patent and that said Letters Patent are hereby corrected as shown below:

In Claim 1, column 4, line 75 to column 5, line 1,

Claim 3, column 5, lines 12-13, and

Claim 4, column 6, lines 1-2:

"1,2,3,4-tetrahydro-6-methoxy-2-carboxylic acid"

should read:

--1,2,3,4-tetrahydro-6-methoxy-carbazole-2-carboxylic acid--.

Signed and sealed this 14th day of January 1975.

(SEAL)
Attest:

McCOY M. GIBSON JR.
Attesting Officer

C. MARSHALL DANN
Commissioner of Patents